United States Patent [19]

Stuemky

[11] 4,429,018
[45] Jan. 31, 1984

[54] HOSE COUPLING FERRULE AND PROCESS

[75] Inventor: Robert E. Stuemky, Elizabeth, Colo.

[73] Assignee: The Gates Rubber Company, Denver, Colo.

[21] Appl. No.: 271,293

[22] Filed: Jun. 8, 1981

[51] Int. Cl.³ .................................................. B22F 5/00
[52] U.S. Cl. ..................................... 428/546; 419/28;
16/108; 285/256; 285/259
[58] Field of Search .......................... 75/200; 428/546;
285/238, 256, 259, 422; 16/108, 109; 419/28

[56] References Cited

U.S. PATENT DOCUMENTS

| | | | |
|---|---|---|---|
| 3,610,665 | 10/1971 | Mingo | 285/256 |
| 3,748,105 | 7/1973 | Reen | 75/208 R |
| 4,150,466 | 4/1979 | Horvath | 285/256 |
| 4,305,608 | | Stuemky | 285/256 |

OTHER PUBLICATIONS

Goetzel, *Treatise on Powder Metallurgy*, vol. I, Interscience Publishers, London (1949), pp. 656-661.
Jones, *Powder Metallurgy*, Edward Arnold Ltd., London (1960), pp. 844-849.
Lenel, *Powder Metallurgy*, N.J. Metal Powder Industries Federation, 1980, pp. 1-10 and pp. 232-239.

*Primary Examiner*—Brooks H. Hunt
*Assistant Examiner*—Anne Brookes
*Attorney, Agent, or Firm*—H. W. Oberg, Jr.; C. H. Castleman, Jr.; Raymond Fink

[57] ABSTRACT

A method for making a powdered metal ferrule by compacting and sintering powdered metal to have a density of at least 80 percent of the theoretical maximum compacted density and an elongation of at least 2.9 percent; and powdered metal ferrule having a density of at least 80 percent of theoretical maximum compacted density and an elongation of at least 2.9 percent.

14 Claims, 8 Drawing Figures

HOSE COUPLING FERRULE AND PROCESS

BACKGROUND OF THE INVENTION

The invention relates to attachable couplings for hose, but more particularly, the invention predominately relates to ferrules of the crushable type.

Hose ferrules may be categorized by the way they function when they are coupled to a hose. There are three general categories or types of ferrules: "undeformed," "expandable," and "crushable." The "undeformed" ferrule variety is not required to change dimensions when used as part of a hose coupling. The ferrules may be adhesively bonded to a hose end, vulcanized to a hose end, or have internal threads and threaded to a hose end. Such ferrules are usually machined from wrought bar stock materials or they are cast and subsequently machined in several places. The ferrules may be used in both high and low hose pressure applications (e.g., pressures from 25 psi to 20,000 psi).

"Expandable" type ferrules are usually stamped from flat sheet stock or stamped tubing. The ferrules are used in low pressure applications (e.g., below 200 psi) such as for garden hose. The ferrules are expanded in the coupling process as a tool that is inserted in the bore of a coupling stem and expanded radially outwardly against the hose wall and in turn against the ferrule. The ferrule slightly expands as the hose is pinched between the stem and ferrule. The ferrule material must withstand the radial expansion without fracturing. For example, garden hose ferrules made of soft brass have an elongation of 30-50 percent where the elongation is considered as a measure of reformability or malleability of the brass ferrule.

Ferrules of the "crushable" type are usually turned from wrought bar stock or drawn from tubing. Such ferrules must have sufficient malleability so as not to fracture when they are crushed such as by crimping or swaging to reduce their circumference by 20 percent or more. Many such ferrules are made from mild steel having an ultimate tensile strength of 65,000 psi and a tensile elongation of 25 percent or more. Again, tensile elongation is an indicator of malleability. The ferrules may be used in both low and high pressure hose applications (e.g., hose pressures up to 20,000 psi depending on hose diameter).

Powdered metal parts are made by pressing metal powder to a desired shape forming a briquette or green part that is later heated and sintered to form a finished part. Powdered metal parts are limited in scope to shapes that may be suitably pressed, and to some physical properties that are substantially lower than parts formed of wrought material. Generally speaking, the powdered metal process offers the advantage of good dimensional control, reduction in or elimination of machining, and substantially the elimination of waste material. Sometimes, powdered metal parts are resized by coining to obtain dimension stability or to increase density and tensile strength. However, ferrous powdered metal parts are seldom, if ever, considered for applications requiring deformation because powdered ferrous metal (e.g., plain iron) exhibits tensile elongation of only about 9 percent at a relatively high compacted powder density (e.g., 89 percent of a theoretical 100 percent). Elongation falls off sharply to about 2 percent at densities of about 75 percent of theoretical. Comparatively, wrought mild steel has a tensile elongation commonly exceeding 30 percent.

Powdered metal parts are usually made to their "in-use" configuration. Some parts may require reconfiguring by removing metal. Heretofore, powdered metal parts were not adaptable for being significantly reconfigured from their sintered shape with part deforming such as by bending, swaging or drawing because of their inherently poor malleability.

This invention is primarily directed to crushable type ferrules. However, an advantage of the invention is that ferrules of the "undeformed" and "internally expandable" type may also be produced.

SUMMARY OF THE INVENTION

In accordance with the invention, a method is provided for making a powdered metal ferrule by pressing metal powder to form a ferrule briquette having a sleeve-type body. The briquette is heated and sintered in usually a reducing atmosphere to form a finished ferrule characterized by having an ultimate tensile elongation of at least about 4 percent at a density of about 82 percent of a theoretical 100 percent compacted density. A salient aspect of the invention is that powdered metal is not expected to be satisfactory for making a crushable ferrule requiring a 20 percent or greater reduction in circumference because of the expected inherent low malleability of powdered metal parts. However, the physical characteristics of density, elongation, and tensile strength improve to unexpectedly acceptable levels when the ferrule is densified as by swaging or crimping when coupling a hose end. This and other aspects or advantages of the invention are explained with reference to the drawings wherein:

DESCRIPTION OF PREFERRED EMBODIMENT

Figure 1:
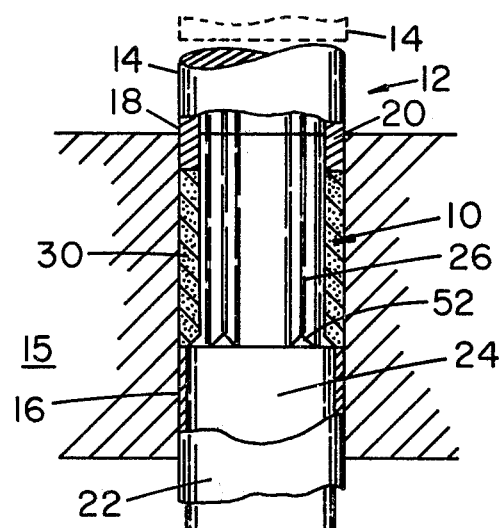
FIG. 1 is a partially cutaway and sectional side view showing a ferrule briquette being pressed in a punch-type powdered metal press.

In the figures, a quantity of metal powder is placed in a cavity 10 of punch-type mold 12 when an upper punch 14 is extracted to an unobstructing position as illustrated by dotted lines. The punch-type mold used to illustrate the method of the invention has four basic components. A mold body 15 (i.e., die) has a cylindrical bore 16 into which fits the upper punch 14 having an annular end portion 18 with an internal wall generally configured as an internal male spline 20 and a tubular lower punch 22. A pin 24 with an external wall configured as a mating generally external female spline 26 fits within the lower punch member 22 and the internal male spline 20 of the upper punch 18. The two punches are forced together pressing the powder to form a green ferrule briquette 30. When subsequently sintered, the ferrule has a density of at least about 80 percent of the maximum theoretical density. The pin 24 may be simultaneously or sequentially moved during the pressing operation to help achieve a desired density. The splined pin and and upper punch coact to form internal ribs 34 along the inside surface of the ferrule briquette. The briquette is removed from the mold cavity and heated in a reducing atmosphere in known fashion to sinter and densify the compressed powder to form a finished ferrule 36. The sintering process imparts a tensile elongation of at least about 4 percent at about 82 percent of maximum theoretical density. More preferably, a tensile elongation of at least about 7 percent is preferred. To achieve the higher elongation the briquette is pressed to a higher density. For example, the ferrule briquette is pressed and sintered about 86 percent of the maximum theoretical density.

Many of the typical metal powders may be used to form the ferrule briquette provided that upon sintering, the ferrule has the requisite elongation for crushing. For example, basic iron powders may be pressed to yield a sintered density of at least about 6.5 g/cc out of a maximum theoretical of 7.87 g/cc. In some applications, it may be desirable to use stainless steel or brass type powders because of their inherent corrosion resistance. However, a powdered iron or steel ferrule may be painted, sealed with a polymer and then electroplated with a corrosion resistant material such as zinc, or it may be mechanically plated with zinc.

Figure 2:
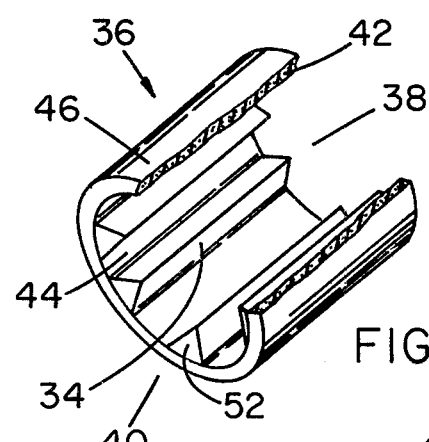
FIG. 2 is a partially cutaway isometric view of a ferrule of the invention as made by the process of the invention.

The finished ferrule 36 as exemplified by FIG. 2 has a sleeve-type body with a fitting end 38, hose end 40, and sidewall 42 defining inner 44 and outer 46 surfaces. In the example ferrule, the hose engaging ribs 34 are formed along the inner surface 44 of the sleeve-body. End portions of the ribs may be chamfered 52 at the hose end when forming the green ferrule briquette. The ends of the ribs are chamfered at an angle A from about 20 degrees to about 45 degrees. Such angles aid in fitting a ferrule onto a hose end. A sintered ferrule made with plain iron type powder has an elongation of about 4.3 percent and a tensile strength of about 22,500 psi at 6.5 g/cc density (82 percent of theoretical) and an elongation of about 9 percent and a tensile strength of about 30,000 psi at a 7 g/cc density (89 percent of theoretical).

Ferrules with a tensile elongation of about 4.3 percent at a density of about 82 percent of maximum theoretical, would not appear to have the requisite malleability to be reduced 20 percent in diameter without fracturing. However, the physical properties of such a ferrule are enhanced to acceptable levels when the ferrule is crushed to a smaller circumference when coupling to an end of a hose.

Figure 8:
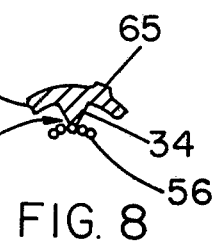
FIG. 8 is an enlarged view taken along the line 8—8 of FIG. 6.
Figure 3:
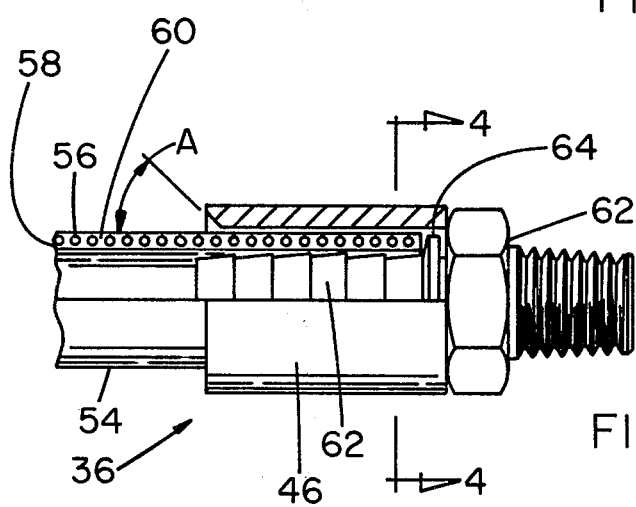
FIG. 3 is a partially cutaway side view showing a ferrule of the invention positioned with a male stem on a hose end.
Figure 4:
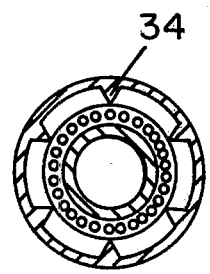
FIG. 4 is a sectional view taken along the line 4—4 of FIG. 3.
Figure 5:
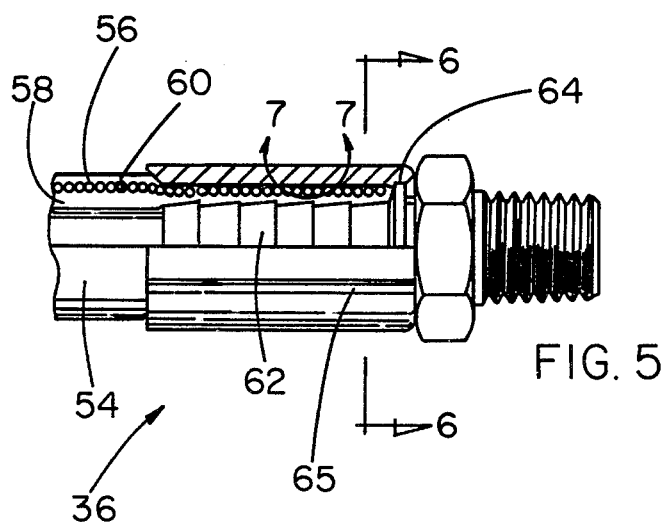
FIG. 5 is a view similar to FIG. 3 but showing the ferrule crushed as by crimping, on the hose end.
Figure 6:
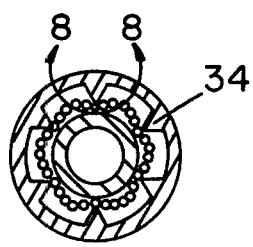
FIG. 6 is a view taken aong the line 6—6 of FIG. 5.

In use, the ferrule 36 is slipped over an end portion of a hose 54. The hose may have a wire reinforcement 56 interpositioned between a tube 58 and cover 60. A male stem 62 is inserted in the hose bore as illustrated by FIG. 3. The ferrule is then crushed to reduce its diameter and consequently circumference, by 20 percent or more, locking the ferrule to a flange 64 of the male stem by deforming a portion of the ribs. The hose engaging ribs 34 cut into the hose cover 60 to contact and press against the reinforcement 56. Crimping may leave axially oriented ridges 64 protruding on the outside surface of the sleeve as illustrated in FIGS. 6 and 8.

As the sleeve is crushed, it is compacted to a higher density which improves its tensile elongation from for example, 4.3 percent at a density of 82 percent of theoretical maximum up to 9.2 percent at a density of 89 percent of maximum when the outside diameter is reduced 20 percent. This increase in elongation improves malleability and tensile strength, and unexpectedly, permits the ferrule to be crushed and retained on the hose during coupling without fracturing. Once cruched to couple a hose end, the ferrule is subjected to hoop tension. Tensile strength is also improved by about 28 percent as the ferrule is crushed to the higher density.

Figure 7:
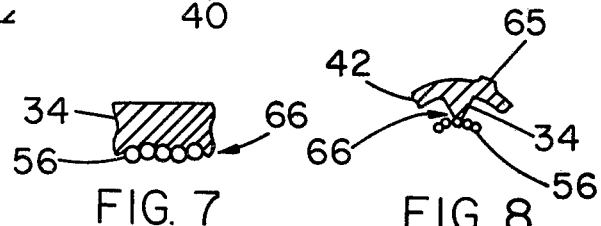
FIG. 7 is an enlarged view taken along the line 7—7 of FIG. 5.

The longitudinally oriented hose engaging ribs initially undergo a slight elongation as the sleeve is reduced in circumference and the ferrule grows in length. The initially soft ribs easily deform around the wire reinforcement (FIGS. 7 and 8). As the ribs deform 66, they compact to a higher density which improves their physical characteristics by increasing hardness and ultimate strength. For example, with a 20 percent reduction in diameter the hardness increased from 39 RF (i.e., Rockwell F scale) to 82 RF. An advantage is that the ribs deform to follow the reinforcement pattern easily when they are soft, and then as they become harder they also become stronger to improve their mechanical grip with the hose reinforcement. Deformation of the ribs along with compaction of the ribs to a higher density is illustrated in FIGS. 7 and 8.

Several examples were prepared to illustrate that a finished ferrule made with powdered iron base material has physical characteristics that are improved by crushing such as crimping. The change in physical characteristics is summarized by the following table:

TABLE I

|  | Density g/cc | Elongation Percent | Hardness (Rockwell) |
|---|---|---|---|
| (outside diameter reduced 20 percent) | | | |
| Example A | | | |
| Before crimp | 6.30 (80% theoretical) | 2.90 | 25 RF |
| After crimp | 6.80 (86.3% theoretical) | 6.70 | 77 RF |
| Example B | | | |
| Before crimp | 6.53 (83% theoretical) | 4.3 | 39 RF |
| After crimp | 6.97 (88.6% theoretical) | 9.2 | 82 RF |
| (outside diameter reduced 25.8 percent) | | | |
| Example C | | | |
| Before crimp | 6.82 (86.7% theoretical) | 7.10 | 46 RF |
| After crimp | 7.30 (92.8% theoretical) | 13.40 | 87 RF |
| Example D | | | |
| Before crimp | 7.11 (90.4% theoretical) | 10.60 | 52 RF |
| After crimp | 7.39 (93.9% theoretical) | 14.80 | 89 RF |

The foregoing detailed description is made for purose of illustration only and is not intended to limit the scope of the invention which is to be determined from the appended claims.

I claim:

1. A method for making a ferrule having a crushable sleeve-type body that is reducible in diameter and with a fitting end, hose end, and sidewall defining inner and outer surfaces, comprising the steps of:

placing a quantity of metal powder in a punch type mold cavity;

pressing the powder and forming the sleeve-type body;

compressing the sleeve-type body and forming a green, ferrule briquette; and sintering the ferrule briquette to a density that is at least about 80 percent of the powdered metal's theoretical 100 percent compacted powder density to define a finished ferrule that when crushed and deformed without resintering as by swaging or crimping, and reduced in diameter by at least about 20 percent, has a density that is at least about 86.3 percent of the powdered metal's theoretical 100 percent compacted powder density but is less than the powdered metal's wrought density.

2. The method for making a ferrule as claimed in claim 1 and including the step of:

pressing iron-based powder and sintering the ferrule briquette to a density of at least about 7.10 g/cc to define a finished ferrule that when crushed and reduced in diameter to at least about 25.8 percent, has a density of at least about 7.39 g/cc.

3. The method for making a ferrule as claimed in claim 1 and including the step of:

forming integral hose engaging ribs that are axially oriented in relation to the sleeve-type body.

4. The method for making a ferrule as claimed in claim 3 and including the step of:

chamfering end portions of the ribs at the hose end when forming the ferrule briquette.

5. The method for making a ferrule as claimed in claim 1 and including the step of:

coating the finished ferrule with a corrosion resistant material.

6. A crimpable hose ferrule comprising:

a sleeve-type body that is reducible in diameter and formed of sintered powdered metal characterized by having a density that is at least about 80 percent of the powdered metal's theoretical compacted density before the body is reduced in diameter and a density that is at least about 86.3 percent of the powdered metal's theoretical 100 percent compacted powder density but is less than the powdered wrought density, when the body is deformed and reduced in diameter by at least about 20 percent as by crimping or swaging without resintering.

7. The hose ferrule as claimed in claim 6 wherein the body is made of iron-based powder and has a density of at least about 6.82 g/cc before the body is reduced in diameter and a density of at least about 7.30 g/cc when the body is reduced in diameter by at least about 25.8 percent.

8. The hose ferrule as claimed in claim 6 wherein powdered metal has a density that is at least 90 percent of the powdered metal's theoretical 100 percent compacted density before the body is reduced in diameter.

9. The hose ferrule as claimed in claim 6 and including a plurality of hose engaging ribs integral with the sleeve body and extending from an inside surface of the sleeve.

10. The hose ferrule as claimed in claim 9 wherein the ribs are longitudinally oriented with a longitudinal axis of the sleeve.

11. The hose ferrule as claimed in claim 9 wherein ends of the ribs are chamfered at an angle from about 20 degrees to about 45 degrees.

12. In a hose assembly of the type with a ferrule and male stem attached to an end portion of a hose by crushing and deforming the ferrule and reducing its diameter by at least about 20 percent as by swaging or crimping, the improvement comprising:

the ferrule having a sleeve-type body formed of sintered powdered metal having a density that is at least about 80 percent of the powdered metal's theoretical 100 percent compacted density before the ferrule is crushed and reduced in diameter, and a density of at least about 86.3 percent of the powdered metal's theoretical 100 percent compacted density but is less than the powdered metal's wrought density after the ferrule is crushed, reduced in diameter, and attached to the hose without resintering.

13. The hose assembly as claimed in claim 12 wherein the ferrule is formed of sintered iron-based powder and has a density of at least about 6.8 g/cc before the ferrule is crushed and attached to the hose.

14. A method for increasing the density of a ferrule to a level suitable for use in attaching the ferrule and a male stem to an end portion of a hose comprising:

forming a ferrule with a sleeve-type body of sintered powdered metal having a density that is at least about 80 percent of the powdered metal's theoretical 100 percent compacted powder density; and crushing and deforming the ferrule and reducing its diameter by at least about 20 percent as by crimping or swaging while simultaneously increasing the density of the body to at least about 86.3 percent of the powdered metal's theoretical 100 percent compacted powder density, but less than the powdered metal's wrought density, without resintering.

* * * * *